Oct. 29, 1940.    A. C. PLÖTZE    2,219,961
IMMERSIBLE MOLD FOR THE PRODUCTION OF HOLLOW MOLDED ARTICLES
Filed Dec. 31, 1935
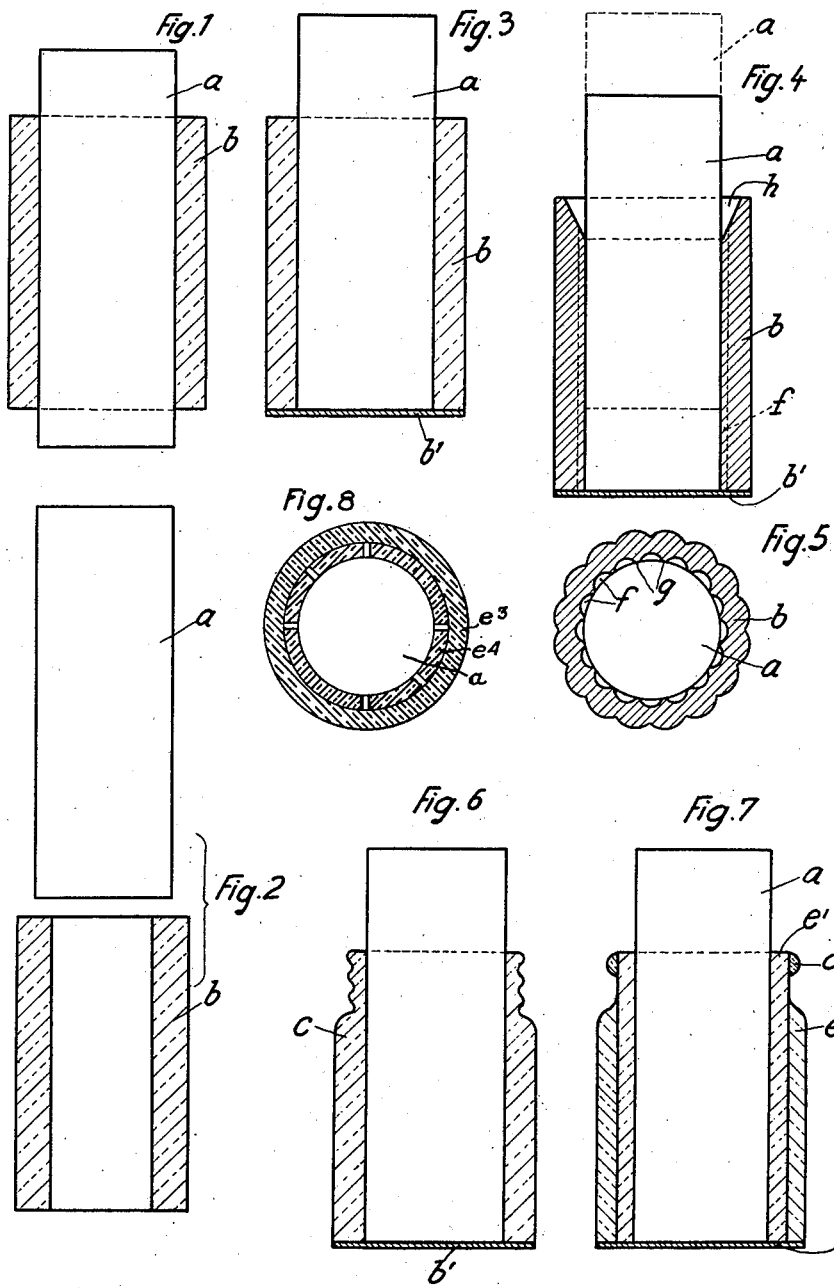
Inventor Patented Oct. 29, 1940

2,219,961

UNITED STATES PATENT OFFICE 2,219,961

IMMERSIBLE MOLD FOR THE PRODUCTION OF HOLLOW MOLDED ARTICLES

Adolf C. Plötze, Charlottenburg, Berlin, Germany, assignor, by mesne assignments, to Neocell Products Corporation, a corporation of Delaware Application December 31, 1935, Serial No. 57,027
In Germany August 30, 1935

7 Claims. (Cl. 18—41)

The invention relates to a multi-part immersible mold for the production of hollow molded articles from cellulose derivatives and like synthetic substances.

Heretofore there have been employed for the manufacture of hollow articles of this kind, by immersion, multi-part molds which are removed from the articles singly. This method is accompanied by the disadvantage that the unavoidable joints between the single parts of the mold create ridges on the articles which call for a subsequent additional treatment of the articles. Moreover, multi-part molds of this nature are expensive to produce, as the parts are required to fit together accurately.

According to the invention, these disadvantages are avoided by the fact that the immersible mold consists of an inner rigid core and an elastic jacket which is expanded by this core to the requisite diameter. The expansion is at least such that after withdrawal of the rigid core the jacket is released from the article on all sides automatically by contraction. Molds of this kind may be produced very cheaply, as the jacket is composed of ordinary commercial rubber hose and the rigid core may be made of wood. The introduction of the rigid core into the elastic jacket takes place with the assistance of a lubricant, such as a glycerine paste, which also has the effect that the rigid core may again be readily removed from the elastic jacket. With the assistance of this mold hollow tubular articles may be produced with any desired thickness of wall.

To enable the immersible mold to be employed also for cup-shaped or pot-shaped articles, the bottom of the elastically expansible jacket, in accordance with an additional feature of the invention, consists of an extremely elastic skin which retains its flat form throughout any expanding movement of the jacket. Elastic skins of this nature, composed for example of rubber, may be connected in seamless fashion with the elastic jacket by vulcanisation. They also enable the rigid core to be introduced in sharp-edged fashion into the elastic jacket down to the bottom thereof.

Further, according to the invention, the inner face of the elastically expansible jacket is divided in such fashion into a large number of semi-cylindrical recesses, that the rigid core upon the expansion of the elastic jacket acts only on a fraction of the inner face thereof. In this way the friction which is required to be overcome between rigid core and elastic jacket, when the two parts are set together, is considerably diminished, and the axially disposed hollow spaces thus resulting may be utilised for the reception of a lubricant and for discharging the air which is displaced between the end face of the rigid core and the bottom of the elastic jacket. By reason of the part-cylindrical form of the axially disposed recesses, there are formed between each two adjacent recesses, ribs which widen out to a considerable degree towards the outer periphery of the jacket and distribute the radial pressure from the core upon the expanding movement, over a comparatively large cross-sectional area. In this way it is accomplished that upon the expanding movement occasioned by the inner rigid core the outer peripheral form of the elastic jacket is retained.

To facilitate the introduction of the rigid core into the elastically expansible jacket the latter is provided with a greater length than is necessary for producing the article concerned, and in its auxiliary portion it is hollowed out in conical fashion, there being effected at the same time, upon the introduction of the rigid core, a centering of the elastic jacket with respect to the core. This conical recess may be utilised for the introduction of a lubricant.

In the mold, according to the invention, the elastically expansible jacket may also consist of a plurality of parts fitting telescopically one within the other. This embodiment is particularly convenient for the production of articles having a reduced neck portion, as the single parts of the jacket may then be withdrawn through the narrow neck of the article more readily than a jacket having a correspondingly greater thickness of wall. In this case the inner jacket may also be composed in the known fashion of segments or other parts, whereby after removal of the rigid core the dismantling and withdrawal of the elastically expansible parts of the mold is still further facilitated.

To be able to withdraw the elastically expansible jacket from the article, and more particularly from articles having a reduced neck portion, with due expediency, provision is made according to the invention for subjecting the inner space of the jacket to the action of a vacuum. This method may be readily performed by applying to the upper edge of the article a disc with suction nozzle, which disc is preferably furnished with a flexible packing material.

Under the suctional action the elastic jacket together with its bottom skin folds together, so that the same may be readily removed from the article. In order in this connection to preclude deformation of the upper edge of the article, the multi-part mold according to the invention is furnished for the purpose of this method with a rigid ring about the upper edge of the jacket expanded by the rigid core. The edge of the article formed about this rigid ring is severed from the article after the mold has been removed from the same.

The immersible mold according to the invention is not only simple in production and assembly, but also permits of a ready detachment of the article. As compared with separable molds the article is entirely devoid of a ridge on the inner surface. The low cost of production permits of a complete utilisation of the surface of the liquid upon the immersion by the use of a correspondingly large number of molds. An appreciable advantage of the multi-part mold according to the invention having the expansible jacket resides in the possibility of providing the molded articles with threads and relief lettering and ornamental irregularities. In addition any desired cross-sectional form of the articles may be produced, so that, in particular, articles having thin walls may be reinforced with advantage by the provision of projectory ribs or ridges on either side. It is also within the scope of the invention to determine the peripheral form of the expansible jacket by the form of the rigid core.

The invention will now be described more fully with reference to the accompanying drawing, in which Fig. 1 shows in a vertical section and in general view a multi-part immersible mold according to the invention, Fig. 2 showing the single parts thereof in general view and section.

Fig. 3 shows in section and general view a multi-part immersible mold for producing pot-shaped articles.

Fig. 4 is a similar view of a modified form of embodiment of the elastically expansible jacket portion, Fig. 5 being a section of Fig. 4.

Figs. 6 and 7 show additional forms of embodiment and assembly of the expansible jacket portion of the mold.

Figure 8 is a cross sectional view of a still further modified arrangement.

The multi-part immersible mold according to Figs. 1 and 2 consists of the rigid core $a$ and the expansible elastic jacket $b$. The rigid part $a$ is preferably made of wood and the expansible part $b$ of soft rubber. The expansion of the elastic jacket $b$ produced by the rigid core $a$ which is introduced into the same with the assistance of a glycerine paste or like lubricant is made to be at least of such extent that after withdrawal of the rigid core the elastic jacket is detached automatically on all sides by contraction from the article which is produced by immersion.

The multi-part mold according to Fig. 3 serves for the production of pot-shaped articles. For this purpose an extremely elastic skin $b^1$ composed of rubber is vulcanized in the form of a bottom on to the end of the elastically expansible jacket. This elastic bottom $b^1$ retains its flat form whilst following any expanding movement on the part of the cylindrical jacket $b$. Since jacket $b$ and bottom $b^1$ are united by vulcanization, there is no joint between the two.

For discharging the air upon the introduction of the rigid core $a$ into the flexible jacket $b$ longitudinal grooves are provided either in the peripheral face of the inner core $a$ or in the inner face of the elastic jacket $b$, or in both parts. These longitudinal grooves at the same time accommodate a lubricant, which is displaced by the end face of the rigid core $a$ when it moves against the bottom $b^1$.

In the form of embodiment according to Figs. 4 and 5 the inner face of the jacket is divided up into a large number of part-cylindrical axially disposed recesses $f$, so that the rigid core $a$ contacts only with the ribs $g$, which remain between these recesses and widen out considerably in the direction towards the outer face of the jacket. In this way the frictional area between jacket $b$ and core $a$ is reduced to a fraction. The part-cylindrical recesses $f$ serve for the reception of a lubricant, and allow the air which is displaced by the end face of the core $a$ (compare the broken lines in Fig. 4) to escape towards the top. To facilitate the introduction of the rigid core $a$ into the elastic jacket $b$ the latter is made longer than is necessary for producing the article and is furnished in this extended portion with a conical recess $h$, which at the same time may be utilized to receive and distribute the lubricant. When introducing the core $a$ into the elastic jacket $b$ this recess $h$ serves for the centering of the two parts.

In Fig. 6 there is shown a multi-part immersible form for producing pot-like articles having a reduced neck portion.

In the reduced portion of the jacket $c$, which is elastically expanded by the rigid core $a$, there are provided thread grooves for producing a thread in the article. In immersible molds of this kind the elastic jacket $c$ may be composed of a plurality of parts fitted telescopically one within the other, as shown in Fig. 7. The cylindrical jackets $e^1$ and $e^2$ form together the part of the mold capable of being expanded by the core $a$.

Fig. 5 shows by its outer peripheral form that with multi-part molds according to the invention articles may be produced with greatly varying form of the wall. It is also possible in accordance with the invention, particularly in the case of articles having thin walls, to make provision for reinforcement in the axial or peripheral direction by means of ribs, grooves or the like.

After removal of the rigid core $a$ by withdrawing the same axially the elastic jacket ($b$ in Fig. 3 or $c$ in Fig. 6 or the parts $e^1$ and $e^2$ in Fig. 7) may be removed from the article by subjecting the inner space of the jacket to a vacuum by applying to the upper edge of the article a disc furnished with a suction nozzle and a flexible facing. Under the action of this vacuum the jacket folds together and may be withdrawn through the orifice in the upper end of the article even if this portion of the article is of restricted size as in Figs. 6 and 7. In order to prevent deformation of the upper edge of the article when the vacuum is applied to the single-part or multi-part mold the upper edge of the expanded jacket may be surrounded by a rigid ring $d$, as shown for example in Fig. 7. The article is formed about this ring $d$.

Upon detachment of the contracted jacket of the mold (for example the jacket $b$ in Fig. 3, the jacket $c$ in Fig. 6 or the jacket portions $e^1$ and $e^2$ in Fig. 7) from the article produced, the rigid ring $d$ forms a counter-bearing which remains connected with the article and in this way prevents any deformation of the edge of the article. The article is then severed below this ring $d$, and the coating on the ring may be returned to the immersion bath to be used anew.

As shown in Figure 8, in cases where inner and outer jackets are employed, the outer jacket $e^3$ may be made of rubber or other resiliently distensible material, and the inner jacket may be formed in segments $e^4$, so that after molding of an article (for example, a bottle having a reduced neck) the core $a$ may be withdrawn, the inner jacket $e^4$ removed piecemeal, and then the outer jacket $e^3$ collapsed and withdrawn.

What I claim as new and desire to secure by Letters Patent is:

1. Molding equipment for producing hollow articles including a tubular elastic body, a second tubular elastic body encircling the first body, an elastic wall overlying and closing two adjacent end of the bodies and secured to the outer one thereof, the second body terminating at its other end short of the other end of the first body, a rigid core insertible into the first body to expand the same and the outer body, and a non-expansible ring encircling the said other end of the first body and spaced from the adjacent end of the second body.

2. Molding equipment for producing hollow articles including a rigid core, an elastic form constituting a jacket for the core, said core being of such size as to expand the jacket and the jacket having longitudinal recesses in its inner face, and a highly elastic bottom for the jacket, the said jacket bearing against the said core only along the elevations formed by said recesses, to provide for insertion of the core into the jacket without trapping air therein.

3. Molding equipment for producing hollow articles including a rigid core, and an elastic form constituting a jacket for the core, the core being of such size as to expand the jacket and the jacket comprising a plurality of parts fitting telescopically one within the other, at least the outer one of said parts being circumferentially complete and formed of resiliently distensible material.

4. Molding equipment for producing hollow articles including a rigid core, an outer elastic form constituting a jacket for the core, and an inner elastic jacket disposed intermediately of the said core and the said form and further comprising a plurality of sections, the core being of such size as to expand both of said jackets.

5. In a device of the character described, a rigid cylindrical core, a form constituting a jacket for the core and having a cylindrical bore therein, the jacket being peripherally continuous on its external surface and formed of resiliently distensible material, the bore in said jacket and the external diameter of the core being of such relative size that the core expands the jacket when inserted therein, the jacket having an end extended beyond the cylindrical bore therein and beyond the length of the jacket necessary for producing the article desired, which extended part is provided with a bore of conical shape flaring from the cylindrical bore to facilitate insertion of the core.

6. In a multi-part immersible mold for forming a hollow article having a reduced neck, a rigid core of generally cylindrical shape, an elastic form constituting a jacket for said core, the wall of the jacket having a portion of reduced thickness for forming the neck of the article, said core being of such size as to expand said jacket, and a highly elastic bottom for the said jacket adapted to retain its flat condition when the said jacket is expanded.

7. An immersion mold for producing a hollow article having a reduced neck and an opening located therein, said mold being composed primarily of two portions, one of which consists of a form of elastic material parts of the exterior surface of which are adapted to mold the body and the reduced neck of the hollow article, said form being hollow to facilitate withdrawal thereof through the reduced neck of an article molded thereon and the thickness of the wall of said elastic form being greater in the portion thereof forming the body of the article than in the portion thereof forming the reduced neck, whereby said form has an external contour generally similar to that of the interior of the article, the other primary portion of said mold consisting of a core insertible into the hollow of said elastic form to maintain the latter in the distended shape desired for the interior contour of the body and neck of the article being produced, the core being removable from the elastic form after molding of an article thereon by withdrawal through the opening in the reduced neck whereupon the elastic form may be withdrawn as aforesaid.

ADOLF C. PLÖTZE.